US010864947B2

(12) United States Patent
Palesano et al.

(10) Patent No.: US 10,864,947 B2
(45) Date of Patent: Dec. 15, 2020

(54) REAR SUPPORT STRUCTURE FOR A VEHICLE

(71) Applicant: Honda Motor Co., Ltd., Tokyo (JP)

(72) Inventors: Timothy J. Palesano, Marysville, OH (US); Kevin A. Veverka, Columbus, OH (US); Christopher R. Freeman, Dublin, OH (US); Rafael Teran, Jr., Westminster, CA (US); Christopher Hinz, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 16/366,127

(22) Filed: Mar. 27, 2019

(65) Prior Publication Data

US 2020/0307712 A1 Oct. 1, 2020

(51) Int. Cl.
*B62D 25/08* (2006.01)
*B60R 21/02* (2006.01)
*B62D 29/04* (2006.01)

(52) U.S. Cl.
CPC .......... *B62D 25/087* (2013.01); *B60R 21/026* (2013.01); *B62D 25/088* (2013.01); *B62D 29/043* (2013.01)

(58) Field of Classification Search
None
See application file for complete search history.

(56) References Cited

U.S. PATENT DOCUMENTS

| | | | | |
|---|---|---|---|---|
| 7,481,476 | B2 | 1/2009 | Heiss et al. | |
| 7,806,467 | B2 | 10/2010 | Sangu et al. | |
| 8,708,403 | B2 | 4/2014 | Herntier et al. | |
| 8,813,888 | B2 | 8/2014 | Ogawa et al. | |
| 9,073,580 | B2 | 7/2015 | Bechtler et al. | |
| 2011/0156447 | A1* | 6/2011 | Matsuoka ............ | B62D 25/088 296/203.04 |
| 2018/0111647 | A1 | 4/2018 | Kim et al. | |
| 2018/0297642 | A1* | 10/2018 | Kudoh ................. | B62D 25/087 |

FOREIGN PATENT DOCUMENTS

| | | |
|---|---|---|
| CN | 202686517 | 1/2013 |
| DE | 102008058005 A1 | 6/2009 |
| JP | 2017154514 A | 9/2017 |

* cited by examiner

*Primary Examiner* — Lori L Lyjak

(74) *Attorney, Agent, or Firm* — American Honda Motor Co., Inc.; William R. Fisher

(57) ABSTRACT

A rear support structure for a vehicle includes a parcel cross-member and a brace assembly. The parcel cross-member extends from a first side structure to a second side structure of the vehicle and includes a first vertical member, a second vertical member, and an upper horizontal member that at least partially define an opening between the cargo area and the passenger compartment. The brace assembly includes a first brace extending across the opening and including a first end secured to the upper horizontal member adjacent a longitudinal centerline of the vehicle and a second brace extending across the opening and including a first end secured to the upper horizontal member adjacent to the longitudinal centerline. The first brace further includes a second end secured to the first vertical member and the second brace includes a second end secured to the first vertical member.

20 Claims, 5 Drawing Sheets

206a 504 204 230 220a 214 X 222a 210 503 202 208a A 232 206 505 222 212 208 506 212 220 502 501 220b 222b 234a 234b 507 206b A1 208b 104 106 210 218 X' 216 226 116

REAR SUPPORT STRUCTURE FOR A VEHICLE

BACKGROUND

Some modern vehicles have a support structure between a cargo area and a passenger compartment of the vehicle. Typically, the support structure is coupled to the chassis of the vehicle to provide rigidity to the chassis and further to minimize effect of a load on the chassis, as transferred by suspension assemblies. In certain scenarios, a load on one side of the chassis may be larger than on other side of the chassis. This may cause the chassis to twist, and detract from the driving experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a rear support structure for a vehicle. The rear support structure for the vehicle may include a parcel cross-member and a brace assembly. The parcel cross-member may be configured to be positioned between a cargo area and passenger compartment of the vehicle. The parcel cross-member may further be configured to extend from a first side structure to a second side structure of the vehicle and may include a pair of horizontal members and a pair of vertical members. The brace assembly may include a bracket, a first brace, and a second brace. The bracket may be configured to be secured to an upper horizontal member of the pair of horizontal members. The first brace may include a first end configured to be secured to the bracket and second end configured to be secured to a first corner portion of a first vertical member of the pair of vertical members. The second brace may include a first end configured to be secured to the bracket and a second corner portion of the second vertical member of the pair of vertical members. The first brace, the second brace, and the bracket may together form a V-shaped brace and a load experienced by the parcel cross-member, as transferred by a corresponding damper of the vehicle, may be redistributed across the vehicle, via the first brace and second brace. Optionally, the first brace, the second brace, and the bracket may together form a V-shaped brace and a load experienced by the parcel cross-member, as transferred by a corresponding damper of the vehicle, may be redistributed to a floor region and a tunnel portion of the vehicle, via the first brace and second brace.

Another exemplary aspect of the disclosure provides a rear support structure for a vehicle that may include a parcel cross-member and a brace assembly. The parcel cross-member may extend from a first side structure of the vehicle to a second side structure of the vehicle. The parcel cross-member may include a first vertical member, a second vertical member, and an upper horizontal member. The first vertical member may be positioned along a first side structure and the second vertical member may be positioned along a second side structure. The upper horizontal member may extend between an upper end of the first vertical member and an upper end of the second vertical member. The first vertical member, the second vertical member, and the upper horizontal member may at least partially define an opening between the cargo area and the passenger compartment. The brace assembly may include a first brace and a second brace. The first brace may extend across the opening and may include a first end secured to the upper horizontal member adjacent a longitudinal centerline of the vehicle. The first brace may further include a second end secured to the first vertical member. The second brace may extend across the opening and may include a first end secured to the upper horizontal member adjacent to the longitudinal centerline of the vehicle. The second brace may include a second end secured to the second vertical member.

Another exemplary aspect of the disclosure provides a rear support structure for a vehicle. The rear support structure of the vehicle may include a parcel cross-member and a brace assembly. The parcel cross-member may be positioned between a cargo area and a passenger compartment. The parcel cross-member may extend between a first side structure and a second side structure of the vehicle. The parcel cross-member may include a first vertical member, a second vertical member, and an upper horizontal member. The first vertical member may be positioned along the first side structure and similarly, the second vertical member may be positioned along the second side structure. The upper horizontal member may extend between an upper end of the first vertical member and an upper end for the second vertical member. The first vertical member, the second vertical member, and the upper horizontal member may at least partially define an opening between the cargo area and the passenger compartment. The brace assembly may include a bracket secured to the upper horizontal member and may include a body extending into the opening between the cargo area and the passenger compartment. The first brace may extend across the opening and may include a first end secured to the body of the bracket and a second end secured to the parcel cross-member adjacent to the first side structure. The brace assembly may further include a first brace that may extend across the opening and include a first end secured to the body of the bracket, and a second end secured to the parcel cross-member adjacent the first side structure. Similarly, the brace assembly may further include a second brace that may extend across the opening and may include a first end secured to the body of the bracket and a second end secured to the parcel cross-member adjacent to the second side structure.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
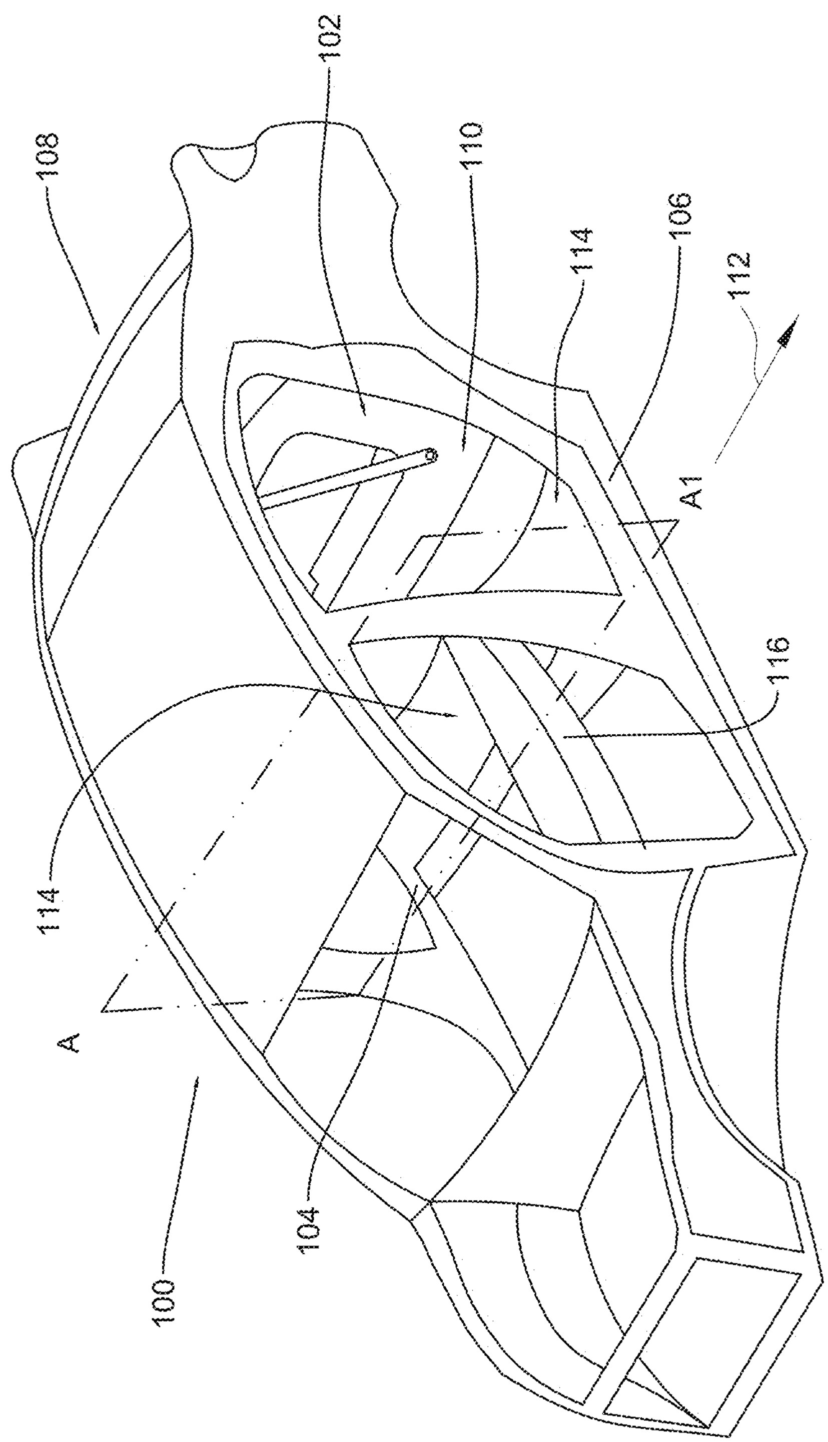
FIG. 1 illustrates a perspective view of a chassis including a rear support structure, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a rear support structure for a vehicle. The disclosed rear support structure includes a parcel cross-member and a brace assembly coupled to the parcel cross-member. In a non-limiting example, the rear support structure is configured to be positioned between a cargo area and a passenger compartment of the vehicle and is provided to reinforce and improve rigidity to the chassis over the base vehicle to create a sport variation.

The disclosed rear support structure provides the brace assembly that allows for an increase in rigidity of the parcel cross-member, without modifying the base structure of the parcel cross-member. The rear support structure including the brace assembly may be assembled on a common assembly line with another vehicle that includes the rear support structure without the brace assembly, which cuts a need to separately assemble the chassis and the rear support structure on separate assembly lines. The disclosed rear support structure also provides an added benefit of not entirely blocking items from being transferred from the cargo area to the passenger compartment, or vice versa when seats are folded down. Additionally, in one configuration, bolting of the brace assembly to the parcel cross-member may allow for the brace assembly to be removed if additional clearance is necessary.

The brace assembly and the parcel cross-member may form a triangle structure which may help to redistribute loads on one side of the chassis to the other side of the chassis and achieve optimal performance in terms of rigidity. The load experienced by the parcel cross member, as transferred by a corresponding damper of the vehicle, may be redistributed to a stiffer floor region, via the brace assembly. More specifically, the brace assembly allows for loads/forces on a corresponding damper on one side of the chassis to be transferred to the other side of the chassis, thereby reducing twist in the chassis and/or other parts of the vehicle.

In contrast, in presence of increased sport focused loads/forces on a corresponding damper on one side of the chassis, a conventional chassis may twist/warp leading to poor handling/feeling. This may happen as the loads/forces experienced by the corresponding damper on one side of the chassis may not be redistributed to the other side of the chassis efficiently.

FIG. 1 illustrates a perspective view of a chassis including a rear support structure, in accordance with an embodiment of the disclosure. With reference to FIG. 1, there is shown a chassis 100 of a vehicle. The chassis 100 may be configured to support a vehicle body and different vehicle components, such as engine, powertrain assembly, suspension assembly, axles, and the like. Also, the chassis 100 may be configured to absorb reactions/loads from engine/axle movements and reactions/loads from wheels while the vehicle is in motion. The chassis 100 may include a rear support structure 102, a first side structure 104, and a second side structure 106. The rear support structure 102 may be positioned between a cargo area 108 and a passenger compartment 110 of the vehicle. As an example, the cargo area 108 may correspond to a trunk of the vehicle and the passenger compartment 110 may correspond to a seating area which may be used to accommodate passengers of the vehicle.

The rear support structure 102 may extend in a vehicle width direction 112 and specifically between the first side structure 104 and the second side structure 106 of the chassis 100. The rear support structure 102 may be provided in the chassis 100 to provide rigidity to the chassis 100 and to uniformly distribute loads/forces transferred by suspension assemblies (not shown), across a floor region 114 and a tunnel portion 116 of the chassis 100.

Figure 4:
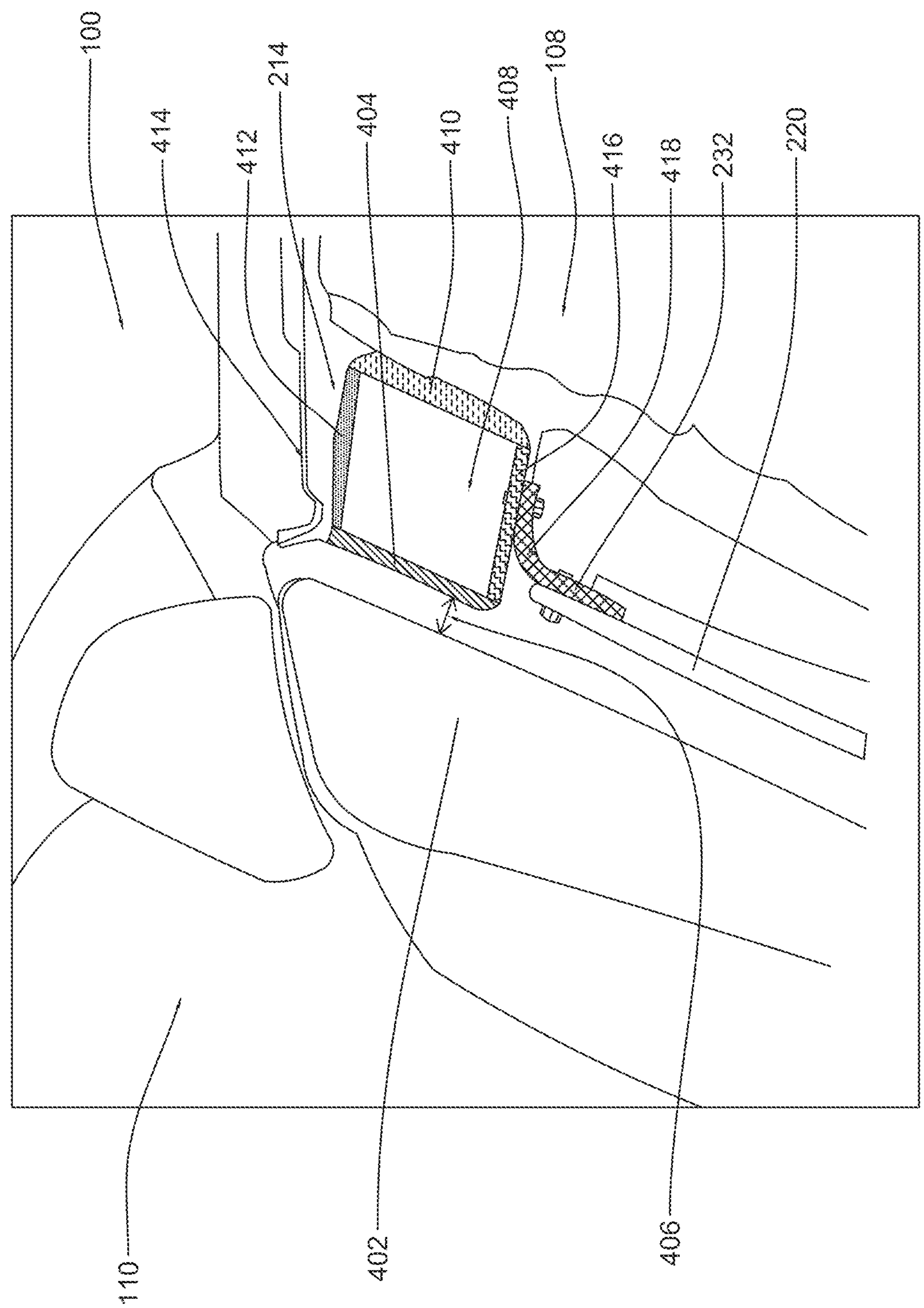
FIG. 4 illustrates a sectional view of the chassis of FIG. 1 along a plane B-B1, in accordance with an embodiment of the disclosure.

In certain embodiments, the rear support structure 102 may be provided beneath a parcel shelf (as shown in FIG. 4) and may be configured to connect upper ends of rear suspension towers (not shown), such as strut towers on both side rears of the chassis 100. The rear support structure 102 may be positioned such that a load on the suspension assembly of the vehicle is transferred to the rear support structure 102, via the rear suspension towers. The rear support structure 102 may be further provided along a rear side of a seat back (as shown in FIG. 4) and may be configured to provide support to a rear seat (not shown) of the vehicle.

In FIG. 1, the chassis 100 is a unibody assembly. However, the disclosure may not be so limiting and in some embodiments, the chassis 100 may be a different type of chassis, such as a monocoque chassis, a tubular type chassis, or a backbone chassis. Also, in FIG. 1, the shape of the chassis 100 may be based on a specific vehicle type, such as a sports model. However, the disclosure may not be so limiting and in some embodiments, the shape of the chassis 100 may be based on other vehicle types, such as sedans, pick-up trucks, convertibles, coupes, vans, station wagons, and other utility vehicles.

It should be noted here that the chassis 100 may also include other components, which have been omitted from the present disclosure for the sake of brevity. Modifications and/or additions (e.g., in terms of design and arrangement) may be made to the chassis 100, without departing from the scope of the present disclosure. Further details of the rear support structure 102 has been provided, for example, in FIGS. 2, 3*a*, 3*b*, and 4.

Figure 2:
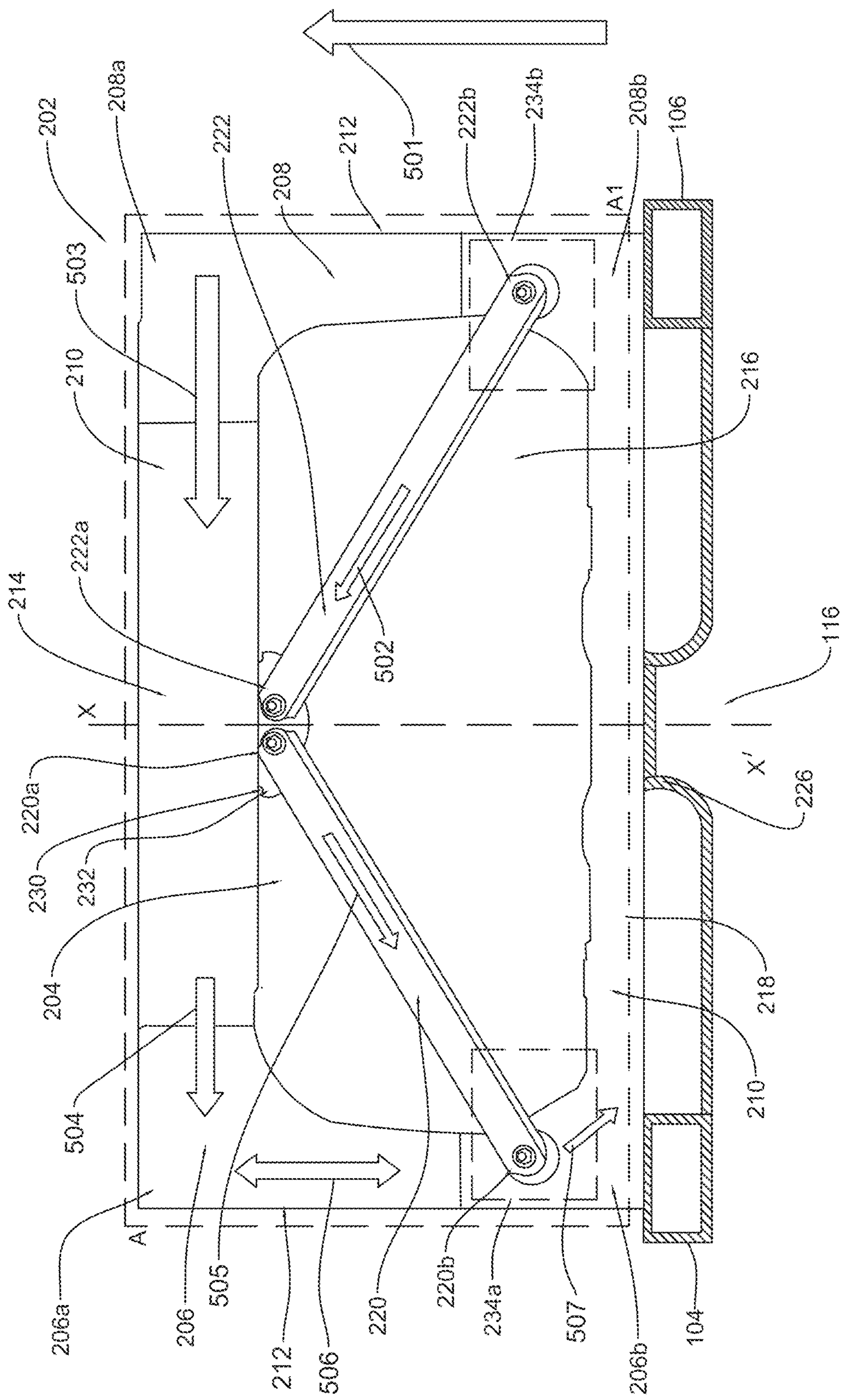
FIG. 2 illustrates a front view of the rear support structure of FIG. 1, in accordance with an embodiment of the disclosure.

FIG. 2 illustrates a front view of the rear support structure of FIG. 1, in accordance with an embodiment of the disclosure. With reference to FIG. 2, there is shown a front view of the rear support structure 102. FIG. 2 is explained in conjunction with elements from FIG. 1. The rear support structure 102 may include a parcel cross-member 202 and a brace assembly 204 coupled to the parcel cross-member 202. The parcel cross-member 202 may be positioned between the cargo area 108 and the passenger compartment 110 of the vehicle and may extend from the first side structure 104 to the second side structure 106 of the vehicle.

The parcel cross-member 202 may include a first vertical member 206 and a second vertical member 208. The first vertical member 206 may be positioned along the first side structure 104 and the second vertical member 208 may be positioned along the second side structure 106. Also, the first vertical member 206 and the second vertical member 208 may be rigid members of the parcel cross-member 202 and may provide strength to pillar members of the chassis 100.

In certain embodiments, the parcel cross-member 202 may include a pair of horizontal members 210 and a pair of vertical members 212. The pair of horizontal members 210 and the pair of vertical members 212 may be configured to be coupled to form a substantially rectangular shape. Also, the pair of horizontal members 210 and the pair of vertical members 212 may be rigidly attached to one another by use of high-strength adhesives, welding techniques, bolting, or riveting to form into a hollow structure.

The parcel cross-member 202 may further include an upper horizontal member 214 which may extend between an upper end 206*a* of the first vertical member 206 and an upper end 208*a* of the second vertical member 208. The first vertical member 206, the second vertical member 208, and the upper horizontal member 214 may at least partially define an opening 216 between the cargo area 108 and the passenger compartment 110. The opening 216 may allow for exchange of goods/items between the passenger compartment 110 and the cargo area 108 of the vehicle when seats are lowered, i.e. folded down. In one or more embodiments, the parcel cross-member 202 may further include a lower horizontal member 218 which may extend between a lower end 206*b* of the first vertical member 206 and a lower end 208*b* of the second vertical member 208. The lower horizontal member 218 may partially define the opening 216 between the cargo area 108 and the passenger compartment 110.

The parcel cross-member 202 may be coupled to the brace assembly 204 which may be configured to provide an increased rigidity to the parcel cross-member 202, without modifying a base structure of the parcel cross-member 202. The brace assembly 204 may include a first brace 220 and a second brace 222 and may be configured to be fastened to the upper horizontal member 214 of the pair of horizontal members 210. The first brace 220 may extend across the opening 216 and may include a first end 220*a* secured to the upper horizontal member 214 adjacent a longitudinal centerline X-X' of the vehicle. Similarly, the second brace 222 may extend across the opening 216 and may include a first end 222*a* secured to the upper horizontal member 214 adjacent the longitudinal centerline X-X' of the vehicle. In accordance with an embodiment, the first end 220*a* of the first brace 220 and the first end 222*a* of the second brace 222 may be further configured to be secured to a middle portion of the upper horizontal member 214 of the pair of horizontal members 210. The middle portion may correspond to a region in which the longitudinal centerline X-X' intersects the upper horizontal member 214.

The first brace 220 may further include a second end 220*b* secured to the first vertical member 206 and may be positioned entirely between the first side structure 104 and the longitudinal centerline X-X'. Similarly, the second brace 222 may further include a second end 222*b* secured to the second vertical member 208 and may be positioned entirely between the second side structure 106 and the longitudinal centerline X-X' of the chassis 100. The second end 220*b* of the first brace 220 may be secured to the first vertical member 206 above the lower horizontal member 218 and the second end 222*b* of the second brace 222 may be secured to the second vertical member 208 above the lower horizontal member 218. The first end 220*a* of the first brace 220 and the first end 222*a* of the second brace 222 may be configured with an aperture or opening adapted to receive fasteners, such as bolts or rivets, for securing the first end 220*a* of the first brace 220 and first end 222*a* of the second brace 222 to the upper horizontal member 214.

The first brace 220 and the second brace 222 may together form a V-shaped brace. The V-shaped brace may be also referred to as a V-shaped brace assembly. More specifically, the first brace 220 and the second brace 222 may be coupled to the upper horizontal member 214 along the horizontal centerline X-X' to form the V-shaped brace assembly. The V-shaped brace may provide a rigid support to the chassis 100 and prevent twists in the chassis 100, in case a load is experienced by the parcel cross-member 202. The load may include reactions/forces received via a corresponding damper (as part of a suspension assembly) which is further transferred to the parcel cross-member 202. These twists may be prevented as the load experienced by the parcel cross-member 202 (as transferred by the corresponding damper/suspension assembly) may be redistributed across the chassis 100, via the first brace 220 and the second brace 222.

In a non-limiting example, the first brace 220 and the second brace 222 may be fully symmetrical and interchangeable. For example, the positions of the first brace 220 and the second brace 222 may be changed so that the first brace 220 is connected to the second vertical member 208 and the second brace 222 is connected to the first vertical member 206. It is also to be understood that the first end 220*a* of the first brace 220 and the first end 222*a* of the second brace 222 may be secured to either the first vertical member 206 or the second vertical member 208 instead of the upper horizontal member 214 or the bracket 230. Accordingly, the second end 220*b* of the first brace 220 and the second end 222*b* of the second brace 222 may be secured to the upper horizontal member 214 or the bracket 230 along the longitudinal centerline X-X'.

In a non-limiting example as shown in FIG. 2, the redistribution of a load applied from a damper from one side of the vehicle to the other side of the vehicle may follow a vertical transfer path 501 along the second vertical member 208, where it is then directed toward the longitudinal centerline X-X' via transfer path 503 along the upper horizontal member 214 and transfer path 502 along the second brace 222. At the longitudinal centerline X-X', a portion of the load continues on the transfer path 504 across the other half of the upper horizontal member 214 and the remaining portion of the load travels along the transfer path 505 along the first brace 220, where the combined load is distributed to the vehicle body along the transfer path 506 of the first vertical member 206 and the transfer path 507 along the first vertical member 206 and the lower horizontal member 218. A portion of the load transferred via the transfer path 507 may be directed to the tunnel portion 116, the first side structure 104, and the floor region 114. It is to be understood that a load applied from a damper on the other side of the vehicle along a path (not shown) on the first vertical member 206 may be transferred to the other side of the vehicle in the same manner (in the opposite direction).

In one or more exemplary embodiments, the brace assembly 204 may further include a bracket 230. The bracket 230 may be configured to be secured to the upper horizontal member 214 of the pair of horizontal members 210. The bracket 230 may include a body 232 which may extend into the opening 216 between the cargo area 108 and the passenger compartment 110. The first brace 220 may have the first end 220*a* configured to be secured to the bracket 230 and the second end 220*b* configured to be secured to a first corner portion 234*a* of the first vertical member 206 of the pair of vertical members 212. Specifically, the first brace 220 may extend across the opening 216 and may include the first end 220*a* secured to the body 232 of the bracket 230 and the second end 220*b* secured to the parcel cross-member 202 adjacent the first side structure 104. Similarly, the second brace 222 may have the first end 222*a* configured to be secured to the bracket 230 and the second end 222*b* configured to be secured to a second corner portion 234*b* of the second vertical member 208 of the pair of vertical members 212. Specifically, the second brace 222 may extend across the opening 216 and may include the first end 222*a* secured to the body 232 of the bracket 230 and the second end 222*b* secured to the parcel cross-member 202 adjacent the second side structure 106.

In an exemplary embodiment, the first end 220*a* of the first brace 220 may be fastened to the bracket 230 and the second end 220*b* of the first brace 220 may be fastened to the first corner portion 234*a*. Similarly, the first end 222*a* of the second brace 222 may be fastened to the bracket 230 and the second end 222*b* of the second brace 222 may be fastened to the second corner portion 234*b*. The first brace 220 and the second brace 222 may be secured to the bracket 230 so that the first brace 220 extends to the first corner portion 234*a* and the second brace 222 extends to the second corner portion 234*b* to essentially form a triangle. The formation of the triangle may help to distribute the load on one side of the chassis 100 to the other side of the chassis 100 and achieve optimal performance in terms of rigidity. Also, the first corner portion 234*a* may correspond to a first location of a first harness mount (not shown in FIG. 2) and the second corner portion 234*b* may correspond to a second location of a second harness mount (not shown in FIG. 2). The first harness mount and the second harness mount may be provided so that seat belt assemblies may be attached to the chassis 100.

Figure 3A:
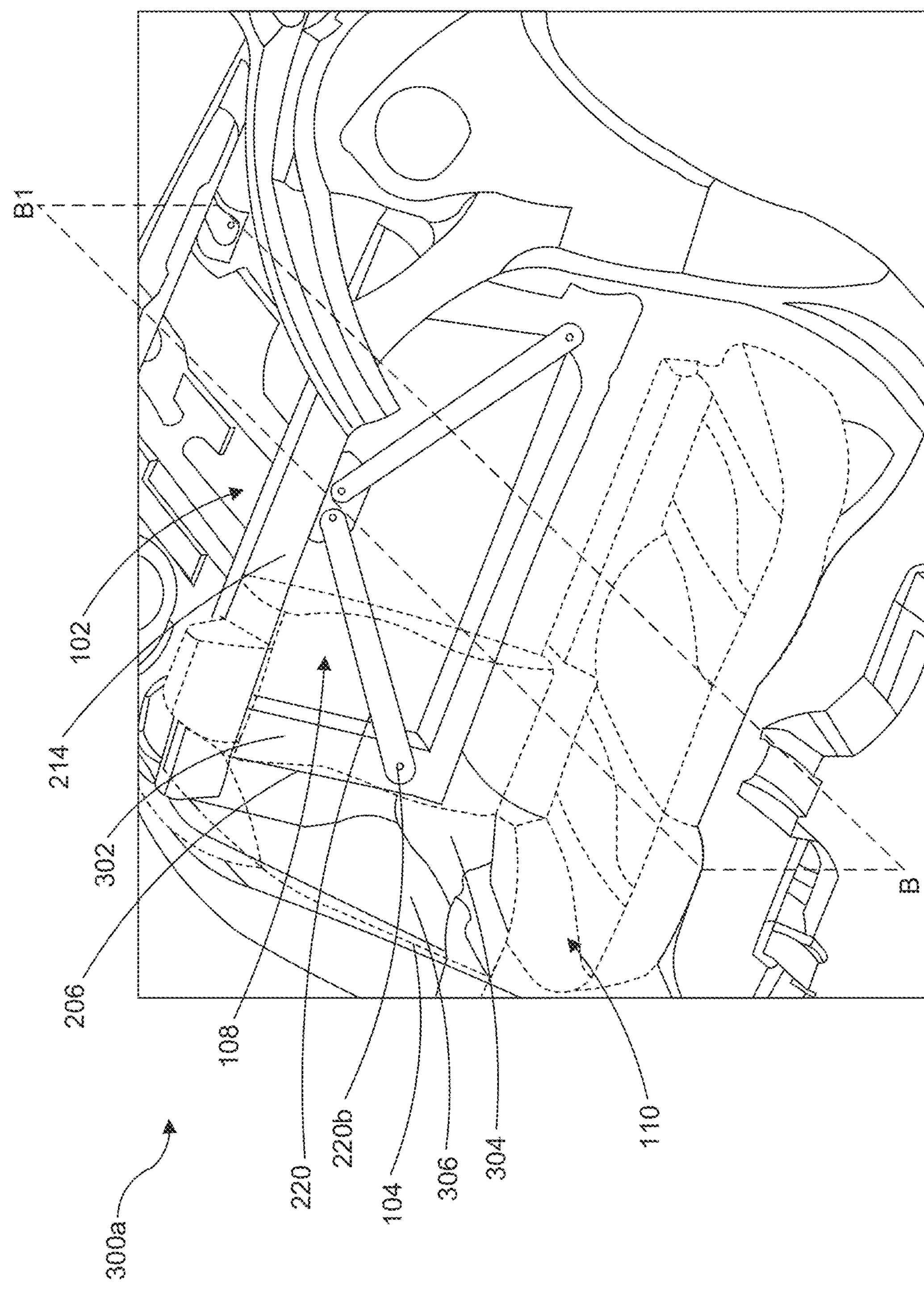
FIGS. 3*a* and 3*b*, collectively, illustrate sectional views of the chassis of FIG. 1 along a plane A-A1, in accordance with an embodiment of the disclosure.
Figure 3B:
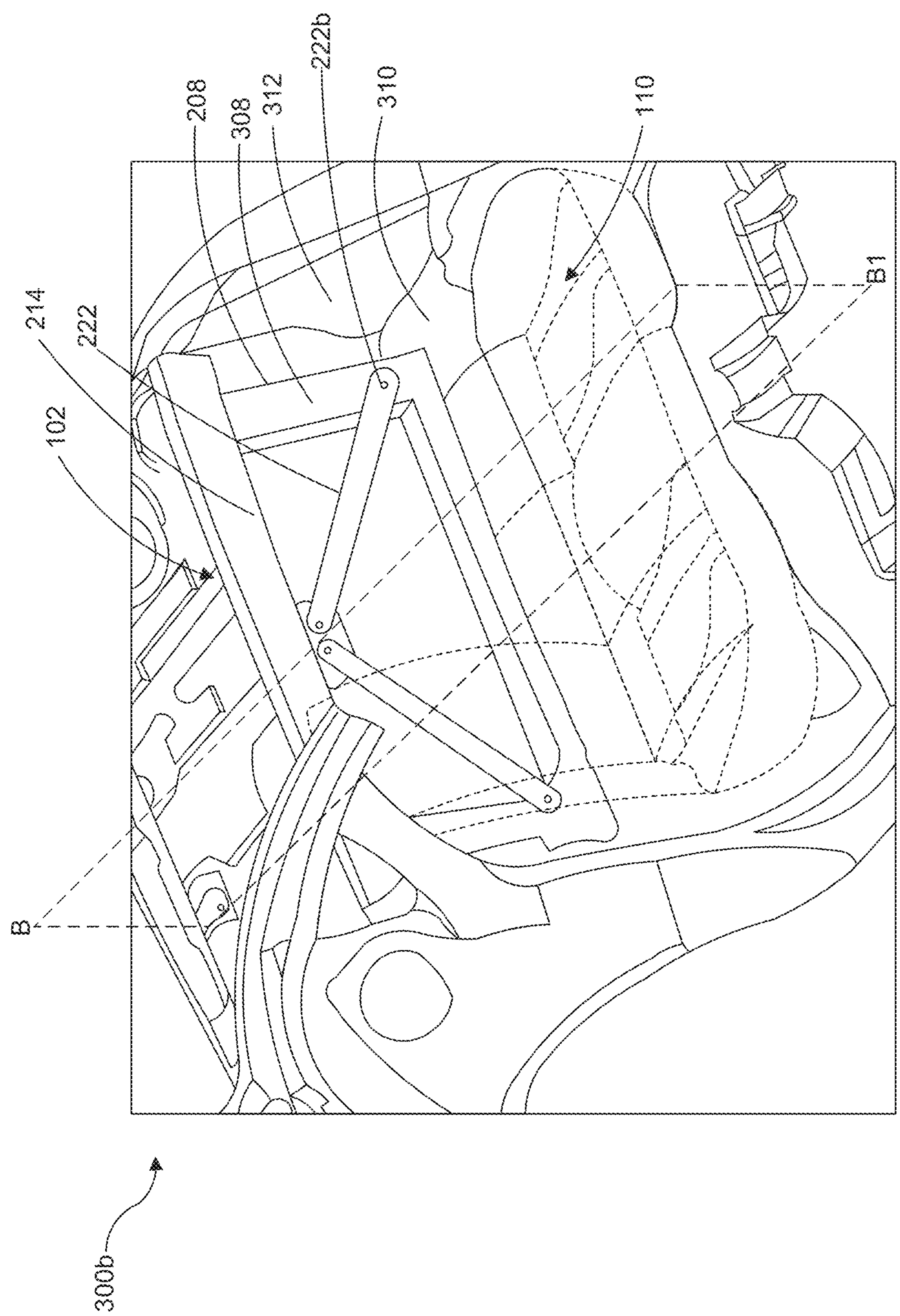

FIGS. 3*a* and 3*b*, collectively, illustrate a sectional view of the chassis of FIG. 1 along a plane A-A1, in accordance with an embodiment of the disclosure. FIGS. 3*a* and 3*b* are explained in conjunction with elements from FIGS. 1 and 2. With reference to FIGS. 3*a* and 3*b*, there is shown a first sectional view 300*a* and a second sectional view 300*b*, respectively. In the first sectional view 300*a*, there is shown the first vertical member 206 which may include a first side 302 facing the passenger compartment 110 and the second end 220*b* of the first brace 220 may be secured to first side 302 of the first vertical member 206. The first side structure 104 may include a first base 304 and a first vertical wall 306 extending upward therefrom. The first vertical member 206 may extend upward from the first base 304 along the first vertical wall 306 and the second end 220*b* of the first brace 220 may be secured to the first vertical member 206 above the first base 304. Similarly, in the second sectional view 300*b*, the second vertical member 208 may include a first side 308 facing the passenger compartment 110 and the second end 222*b* of the second brace 222 may be secured to the first side 308 of the second vertical member 208. The second side structure 106 may include a second base 310 and a second vertical wall 312 extending upward therefrom. The second vertical member 208 may extend upward from the second base 310 along the second vertical wall 312 and the second end 222*b* of the second brace 222 may be secured to the second vertical member 208 above the second base 310.

FIG. 4 illustrates a sectional view of the chassis of FIG. 1 along a plane B-B1, in accordance with an embodiment of the disclosure. FIG. 4 is explained in conjunction with elements from FIGS. 1, 2, 3*a*, and 3*b*. With reference to FIG. 4, there is shown a sectional view 400 of the chassis 100. In the sectional view 400, there is shown a seat back 402 and the upper horizontal member 214 including a first wall 404 facing the passenger compartment 110. In certain embodiments, the seat back 402 may be included in the rear support structure 102. The first wall 404 of the upper horizontal member 214 and the seat back 402 may define a gap 406 there-between when the seat back 402 is in a raised position and the first brace 220 and the second brace 222 are each positioned outside of the gap 406.

The upper horizontal member 214 may further include a hollow structure 408. The hollow structure 408 may be defined by the first wall 404, a second wall 410 positioned opposite the first wall 404 and facing the cargo area 108, an upper wall 412 defined by a parcel shelf 414, and a lower wall 416 positioned opposite the upper wall 412 and extending from the first wall 404 to the second wall 410. The parcel shelf 414 may be configured to receive a plurality of entertainment speakers, an auxiliary rear tail lamp unit or may provide additional storage space in the passenger compartment 110.

The first end 220*a* of the first brace 220 and the first end 222*a* of the second brace 222 may be positioned rearward of at least a portion of the first wall 404 of the upper horizontal member 214 and entirely forward of the second wall 410 of the upper horizontal member 214. The entire brace assembly 204 may be positioned forward of the second wall 410 of the upper horizontal member 214.

The bracket 230 may include a base 418 and may be secured to the lower wall 416 of the upper horizontal member 214. The body 232 may be included in the bracket 230 and may extend forward and downward from the base 418. The first end 220*a* of the first brace 220 may be secured to the body 232 of the bracket 230 positioned adjacent to the longitudinal centerline X-X' of the chassis 100. The base 418 of the bracket 230 may be secured to the lower wall 416 of the upper horizontal member 214 by utilizing bolts, screws, rivets or welding techniques.

Various embodiments of the disclosure may provide a method of assembling the rear support structure 102 for a vehicle. The method may include securing the first end 220*a* of the first brace 220 to the bracket 230 secured to the upper horizontal member 214 of the parcel cross-member 202. The method may further include securing the second end 220*b* of the first brace 220 to the first corner portion 234*a* of the first vertical member 206 of the parcel cross-member 202. The method may further include securing the first end 222*a* of the second brace 222 to the bracket 230 and securing the second end 222*b* of the second brace 222 to the second corner portion 234*b* of the second vertical member 208 of the parcel cross-member 202. A load experienced by the parcel cross-member 202, as transferred by a corresponding damper, may be redistributed to the floor region 114 and the tunnel portion 116 of the chassis 100 of the vehicle, via the first brace 220 and the second brace 222.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Reference will now be made in detail to specific aspects or features, examples of which are illustrated in the accompanying drawings. Wherever possible, corresponding or similar reference numbers will be used throughout the drawings to refer to the same or corresponding parts.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A rear support structure for a vehicle, the rear support structure comprising:

a parcel cross-member that is positioned between a cargo area and a passenger compartment and is configured to extend from a first side structure to a second side structure of the vehicle, wherein the parcel cross-member comprises a pair of horizontal members and a pair of vertical members; and a brace assembly comprising:

a bracket configured to be secured to an upper horizontal member of the pair of horizontal members;

a first brace having a first end configured to be secured to the bracket and a second end configured to be secured to a first corner portion of a first vertical member of the pair of vertical members; and a second brace having a first end configured to be secured to the bracket and a second end configured to be secured to a second corner portion of a second vertical member of the pair of vertical members, wherein the first brace, the second brace and the bracket together form a V-shaped brace, and wherein a load experienced by the parcel cross-member, as transferred by a corresponding damper of the vehicle, is redistributed via the first brace and the second brace.

2. The rear support structure according to claim 1, wherein the pair of vertical members and the pair of horizontal members are configured to be coupled to form a substantially rectangular shape.

3. The rear support structure according to claim 1, wherein the first end of the first brace is fastened to the bracket and the second end of the first brace is fastened to the first corner portion, and wherein the first end of the second brace is fastened to the bracket and the second end of the second brace is fastened to the second corner portion.

4. The rear support structure according to claim 1, wherein the first end of the first brace and the first end of the second brace are further configured to be attached to a middle portion of the upper horizontal member of the pair of horizontal members.

5. The rear support structure according to claim 4, wherein the V-shaped brace provides a rigid support to a chassis of the vehicle and prevents a twist in the chassis in case the load is experienced by the parcel cross-member.

6. The rear support structure according to claim 1, wherein the V-shaped brace comprises an opening between the cargo area and the passenger compartment for exchange of goods between the passenger compartment and the cargo area of the vehicle when seats are lowered.

7. The rear support structure according to claim 1, wherein the first brace and the second brace are symmetrical and interchangeable.

8. The rear support structure according to claim 1, wherein the redistribution of the load follows a first transfer path and a second transfer path.

9. The rear support structure according to claim 8, the first transfer path extends from the first brace to a corresponding first portion of each of a tunnel portion and a floor region, and wherein the second transfer path extends from the second brace to a corresponding second portion of each of the tunnel portion and the floor region.

10. A rear support structure for a vehicle, the rear support structure comprising:

a parcel cross-member positioned between a cargo area and a passenger compartment, the parcel cross-member extends from a first side structure of the vehicle to a second side structure of the vehicle, the parcel cross-member comprising:

a first vertical member positioned along the first side structure;

a second vertical member positioned along the second side structure; and an upper horizontal member extending between an upper end of the first vertical member and an upper end of the second vertical member, wherein the first vertical member, the second vertical member, and the upper horizontal member at least partially define an opening between the cargo area and the passenger compartment; and a brace assembly comprising:

a first brace that extends across the opening and includes a first end secured to the upper horizontal member adjacent a longitudinal centerline of the vehicle and a second end secured to the first vertical member; and a second brace that extends across the opening and includes a first end secured to the upper horizontal member adjacent the longitudinal centerline of the vehicle and a second end secured to the second vertical member.

11. The rear support structure of claim 10, wherein the first brace is positioned entirely between the first side structure and the longitudinal centerline of the vehicle, and the second brace is positioned entirely between the second side structure and the longitudinal centerline of the vehicle.

12. The rear support structure of claim 11, wherein the parcel cross-member includes a lower horizontal member extending between a lower end of the first vertical member and a lower end of the second vertical member, the lower horizontal member partially defines the opening between the cargo area and the passenger compartment, the second end of the first brace is secured to the first vertical member above the lower horizontal member, and the second end of the second brace is secured to the second vertical member above the lower horizontal member.

13. The rear support structure of claim 12, wherein the first vertical member includes a first side facing the passenger compartment, the second vertical member includes a first side facing the passenger compartment, the second end of the first brace is secured to first side of the first vertical member, and the second end of the second brace is secured to the first side of the second vertical member.

14. The rear support structure of claim 13, wherein the first side structure comprises a first base and a first vertical wall extending upward therefrom, the first vertical member extends upward from the first base along the first vertical wall, and the second end of the first brace is secured to the first vertical member above the first base, and wherein the second side structure comprises a second base and a second vertical wall extending upward therefrom, the second vertical member extends upward from the second base along the second vertical wall, and the second end of the second brace is secured to the second vertical member above the second base.

15. The rear support structure of claim 14, further comprising a seat back, wherein the upper horizontal member comprises a hollow structure defined by a first wall facing the passenger compartment, a second wall positioned opposite the first wall and facing the cargo area, an upper wall defined by a parcel shelf, and a lower wall positioned opposite the upper wall and extending from the first wall to the second wall, wherein the first wall of the upper horizontal member and the seat back define a gap there-between when the seat back is in a raised position, and the first brace and the second brace are each positioned outside of the gap, and wherein the first end of the first brace and the first end of the second brace are positioned rearward of at least a portion of the first wall of the upper horizontal member and the entire brace assembly is positioned forward of the second wall of the upper horizontal member.

16. A rear support structure for a vehicle, the rear support structure comprising:

- a parcel cross-member positioned between a cargo area and a passenger compartment that extends from a first side structure of the vehicle to a second side structure of the vehicle, the parcel cross-member comprising:
  - a first vertical member positioned along the first side structure;
  - a second vertical member positioned along the second side structure; and
  - an upper horizontal member extending between an upper end of the first vertical member and an upper end of the second vertical member,
  - wherein the first vertical member, the second vertical member, and the upper horizontal member at least partially define an opening between the cargo area and the passenger compartment; and
- a brace assembly comprising:
  - a bracket secured to the upper horizontal member, the bracket includes a body extending into the opening between the cargo area and the passenger compartment;
  - a first brace that extends across the opening and includes a first end secured to the body of the bracket and a second end secured to the parcel cross-member adjacent the first side structure; and
  - a second brace that extends across the opening and includes a first end secured to the body of the bracket and a second end secured to the parcel cross-member adjacent the second side structure.

17. The rear support structure according to claim 16, further comprising a seat back, wherein the upper horizontal member includes a first wall facing the passenger compartment, wherein the first wall of the upper horizontal member and the seat back define a gap there-between when the seat back is in a raised position, and the first brace and the second brace are each positioned outside of the gap.

18. The rear support structure according to claim 17, wherein the upper horizontal member comprises a hollow structure defined by the first wall, a second wall positioned opposite the first wall and facing the cargo area, an upper wall defined by a parcel shelf, and a lower wall positioned opposite the upper wall and extending from the first wall to the second wall, wherein the first end of the first brace and the first end of the second brace are positioned rearward of at least a portion of the first wall of the upper horizontal member and entirely forward of the second wall of the upper horizontal member.

19. The rear support structure according to claim 18, wherein the first vertical member includes a first side facing the passenger compartment, the second vertical member includes a first side facing the passenger compartment, the second end of the first brace is secured to the first side of the first vertical member, and the second end of the second brace is secured to the first side of the second vertical member.

20. The rear support structure according to claim 19, wherein the bracket includes a base secured to the lower wall of the upper horizontal member and the body extends forward and downward from the base, the first end of the first brace is secured to the body of the bracket adjacent a longitudinal centerline of the vehicle, the first end of the second brace is secured to the body of the bracket adjacent the longitudinal centerline of the vehicle and the entire brace assembly is positioned forward of the second wall of the upper horizontal member.

* * * * *